(12) United States Patent
Tang

(10) Patent No.: US 11,711,244 B2
(45) Date of Patent: *Jul. 25, 2023

(54) METHOD FOR TRANSMITTING SOUNDING REFERENCE SIGNAL, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,960

(22) Filed: Sep. 30, 2021

(65) Prior Publication Data
US 2022/0021561 A1    Jan. 20, 2022

Related U.S. Application Data

(63) Continuation of application No. 16/478,097, filed as application No. PCT/CN2017/071422 on Jan. 17, 2017, now Pat. No. 11,165,607.

(51) Int. Cl.
*H04L 25/02* (2006.01)
*H04L 5/00* (2006.01)
*H04W 72/0446* (2023.01)

(52) U.S. Cl.
CPC ........ *H04L 25/0226* (2013.01); *H04L 5/0012* (2013.01); *H04L 5/0051* (2013.01); *H04L 5/0094* (2013.01); *H04W 72/0446* (2013.01)

(58) Field of Classification Search
CPC . H04L 25/0226; H04L 5/0012; H04L 5/0094; H04L 5/0051; H04W 72/0446
See application file for complete search history.

(56) References Cited

U.S. PATENT DOCUMENTS 6,581,179 B1 *  6/2003  Hassan ................. H04L 1/0045
                                                714/776
8,537,876 B2 *  9/2013  Hooli .................... H04L 5/0048
                                                370/335

(Continued)

OTHER PUBLICATIONS

First Office Action of the Vietnamese application No. 1-2019-04317, dated Jul. 20, 2022 with an unofficial translation by KENFOX.

(Continued)

*Primary Examiner* — Parth Patel
(74) *Attorney, Agent, or Firm* — Ladas & Parry, LLP

(57) ABSTRACT

Disclosed are a method for transmitting a sounding reference signal, a terminal device and a network device. The method comprises: a terminal device determining, in a first time-domain resource unit, a plurality of second time-domain resource units for sending a sounding reference signal (SRS) of the terminal device; the terminal device determining, according to a frequency hopping pattern of the terminal device, a target resource for sending the SRS on the plurality of second time-domain resource units; and the terminal device sending, according to the target resource, the SRS to a network device. The present invention reduces the interference of SRS signals between different terminal devices, and also avoids the occurrence of a continuous strong interference situation between terminal devices.

20 Claims, 4 Drawing Sheets

(56) References Cited

U.S. PATENT DOCUMENTS

| | | | |
|---|---|---|---|
| 9,628,140 B2* | 4/2017 | Xie | H04L 5/0094 |
| 10,511,351 B2* | 12/2019 | Zhang | H04L 5/0064 |
| 10,834,715 B2* | 11/2020 | Sun | H04L 5/0048 |
| 10,925,040 B2* | 2/2021 | Zhou | H04W 72/12 |
| 10,925,085 B2* | 2/2021 | Um | H04W 72/14 |
| 2009/0046645 A1* | 2/2009 | Bertrand | H04J 11/0069 |
| | | | 370/329 |
| 2010/0103902 A1* | 4/2010 | Kim | H04L 5/0055 |
| | | | 370/344 |
| 2010/0195532 A1* | 8/2010 | Pajukoski | H04L 5/06 |
| | | | 370/254 |
| 2010/0265910 A1* | 10/2010 | Suo | H04L 5/0048 |
| | | | 370/330 |
| 2010/0296480 A1* | 11/2010 | Nouda | H04W 72/085 |
| | | | 370/330 |
| 2011/0007778 A1* | 1/2011 | Kishiyama | H04L 5/0091 |
| | | | 375/E1.033 |
| 2011/0058505 A1* | 3/2011 | Pan | H04J 11/005 |
| | | | 370/280 |
| 2011/0222588 A1* | 9/2011 | Ko | H04B 7/0689 |
| | | | 375/135 |
| 2011/0235682 A1* | 9/2011 | He | H04L 5/0051 |
| | | | 375/132 |
| 2011/0294529 A1* | 12/2011 | Luo | H04L 5/0035 |
| | | | 455/509 |
| 2011/0310931 A1* | 12/2011 | Mehta | H04W 88/08 |
| | | | 375/135 |
| 2012/0008589 A1* | 1/2012 | Iwai | H04B 1/713 |
| | | | 370/329 |
| 2012/0051265 A1* | 3/2012 | Shen | H04L 5/0035 |
| | | | 370/254 |
| 2012/0113967 A1* | 5/2012 | Smith | H04B 1/7143 |
| | | | 375/E1.033 |
| 2012/0252474 A1* | 10/2012 | Tiirola | H04L 5/0053 |
| | | | 455/450 |
| 2013/0003659 A1* | 1/2013 | Iwai | H04L 5/0048 |
| | | | 370/328 |
| 2013/0078913 A1* | 3/2013 | Lee | H04W 52/18 |
| | | | 455/39 |
| 2013/0201941 A1* | 8/2013 | Glasson | H04W 72/1278 |
| | | | 370/329 |
| 2013/0287047 A1* | 10/2013 | Tanaka | H04L 1/0028 |
| | | | 370/496 |
| 2014/0219202 A1* | 8/2014 | Kim | H04W 72/042 |
| | | | 370/329 |
| 2014/0349645 A1* | 11/2014 | Webb | H04W 52/0206 |
| | | | 455/435.1 |
| 2015/0256286 A1* | 9/2015 | Johnson | H04K 3/44 |
| | | | 455/1 |
| 2018/0076946 A1* | 3/2018 | Li | H04W 72/0446 |
| 2018/0123850 A1* | 5/2018 | Zarifi | H04L 27/26025 |
| 2018/0183552 A1* | 6/2018 | Hosseini | H04L 5/0051 |
| 2018/0191483 A1* | 7/2018 | Yamazaki | H04W 74/0833 |
| 2018/0213513 A1* | 7/2018 | Sun | H04J 11/00 |
| 2018/0278384 A1* | 9/2018 | Manolakos | H04L 25/0224 |
| 2018/0323917 A1* | 11/2018 | Um | H04L 5/0048 |
| 2019/0037562 A1* | 1/2019 | Park | H04W 72/042 |
| 2019/0045544 A1* | 2/2019 | Wang | H04L 5/0094 |
| 2019/0132103 A1* | 5/2019 | Yang | H04W 72/042 |
| 2019/0166514 A1* | 5/2019 | Liu | H04L 1/0026 |
| 2019/0173607 A1* | 6/2019 | Liu | H04B 7/063 |
| 2019/0215828 A1* | 7/2019 | Kim | H04W 74/08 |
| 2019/0222364 A1* | 7/2019 | Shimoda | H04W 28/06 |
| 2019/0260544 A1* | 8/2019 | Dou | H04W 72/082 |
| 2019/0356446 A1* | 11/2019 | Kim | H04W 72/0453 |
| 2019/0372805 A1* | 12/2019 | Tang | H04L 5/0094 |
| 2020/0052866 A1* | 2/2020 | Manolakos | H04W 72/1278 |
| 2020/0052868 A1* | 2/2020 | Zhang | H04W 72/042 |
| 2020/0092151 A1* | 3/2020 | Zarifi | H04J 13/0062 |
| 2020/0322187 A1* | 10/2020 | He | H04W 72/0446 |

OTHER PUBLICATIONS

First Office Action of the Indonesian application No. P00201907021, dated Oct. 7, 2021 (documents D1, D2, and D3 cited therein were considered in parent U.S. Appl. No. 16/478,087).

Office Action of the Australian application No. 2017393966, dated Sep. 16, 2021.

First Office Action of the Mexican application No. MX/a/2019/008477, dated Oct. 3, 2022.

* cited by examiner

METHOD FOR TRANSMITTING SOUNDING REFERENCE SIGNAL, TERMINAL DEVICE AND NETWORK DEVICE

CROSS-REFERENCE TO RELATED APPLICATIONS

This application is a continuation of U.S. application Ser. No. 16/478,097 filed on Jul. 15, 2019, which is a U.S. national phase application of International Application No. PCT/CN2017/071422, filed on Jan. 17, 2017, the disclosures of which are hereby incorporated by reference in their entireties.

TECHNICAL FIELD

The disclosure relates to the field of wireless communication, and in particular to a method for transmitting a Sounding Reference Signal (SRS), a terminal device and a network device.

BACKGROUND

In a Long Term Evolution (abbreviated as "LTE") system, a terminal receives a cell Sounding Reference Signal (abbreviated as "SRS") subframe broadcast by a network side via high-level signaling and the SRS only can be transmitted in the cell SRS subframe. The terminal needs to perform rate matching on a Physical Uplink Shared Channel (abbreviated as "PUSCH") or a Physical Uplink Control Channel (abbreviated as "PUCCH") in the cell SRS subframe during data transmission. When there is a conflict between a bandwidth for transmitting the PUCCH or PUSCH and a bandwidth for transmitting an SRS resource in the cell SRS subframe, the terminal may send an shortened PUCCH or PUSCH, and reserves a last Orthogonal Frequency Division Multiplexing (abbreviated as "OFDM") symbol of an uplink subframe for sending the PUCCH or PUSCH to transmit the SRS.

At present, there are two types of SRS transmission, including periodic SRS and aperiodic SRS. The periodic SRS is continuously sent at a certain cycle on a periodic resource preconfigured by the network side, while the aperiodic SRS is triggered via Download Control Information (abbreviated as "DCI"). Responsive to receiving the trigger signaling, the terminal performs one SRS transmission on a nearest SRS resource. A set of SRS resources for transmitting the aperiodic SRS is preconfigured by the network side via high-level signaling, and the configuration for resources of the aperiodic SRS is independent from configuration for resources of the periodic SRS. Since the flexibility of the aperiodic SRS is higher, the aperiodic SRS is more widely applied than the periodic SRS in a 5th-Generation (5G) system.

However, in the 5G system, one slot may have a multiple OFDM symbols for transmitting the SRS. If different terminals select a same resource in these OFDM symbols to transmit the respective SRSs, huge continuous interference may be generated to other terminals.

SUMMARY

The embodiments of the disclosure provide a method for transmitting an SRS, a terminal device and a network device, which can reduce the interference between SRS signals of different terminal devices.

A first aspect provides a method for transmitting an SRS, which may include the following operations. A terminal device determines multiple second time-domain resource units for sending an SRS of the terminal device within a first time-domain resource unit. The terminal device determines, according to a hopping pattern of the terminal device, target resources for sending the SRS on the multiple second time-domain resource units. The terminal device sends the SRS to a network device according to the target resources.

Therefore, the terminal device determines, via its own exclusive hopping pattern, resources for sending the SRS on multiple time-domain resource units, so that the interference between different terminal devices for transmitting the SRS in the multiple time-domain resource units is randomized, the interference of the SRS signals between the different terminal devices is reduced, and the continuous strong interference between the terminal devices is also prevented.

In at least one embodiment, in an implementation manner of the first aspect, the first time-domain resource unit is a slot, a mini-slot or an OFDM symbol.

In at least one embodiment, in an implementation manner of the first aspect, each of the second time-domain resource units is an OFDM symbol.

Specifically, the first time-domain resource unit includes multiple second time-domain resource units. A length of a second time-domain resource unit is less than a length of the first time-domain resource. For example, the first time-domain resource unit is a subframe, and the second time-domain resource unit is an OFDM symbol; or, the first time-domain resource unit is an OFDM symbol, and the second time-domain resource unit is an OFDM symbol having a length less than a length of the first time-domain resource unit.

For example, the length of the first time-domain resource unit may be determined according to a sub-carrier spacing for transmitting the data in the first time-domain resource unit, and the length of the second time-domain resource unit may be determined according to a sub-carrier spacing for transmitting the SRS in the first time-domain resource unit.

Also for example, the first time-domain resource unit may be a slot, and the length of the second time-domain resource unit is determined according to a sub-carrier spacing for transmitting the data in the first time-domain resource unit.

In at least one embodiment, the operation that the terminal device determines multiple second time-domain resource units for sending an SRS of the terminal device within the first time-domain resource unit may include the following actions. The terminal device receives DCI sent by the network device, and the DCI is to indicate the multiple second time-domain resource units for sending the SRS in the first time-domain resource unit. The terminal device determines the multiple second time-domain resource units according to the DCI.

Information on positions, number and the like of the multiple second time-domain resource units may also be agreed between the terminal device and the network device in advance, and may be, for example, agreed in a protocol.

In at least one embodiment, in an implementation manner of the first aspect, each of the target resources is at least one of a frequency-domain resource or a code resource.

In at least one embodiment, in an implementation manner of the first aspect, the target resources are frequency-domain resources for sending the SRS, and the hopping pattern is a frequency-domain resource hopping pattern. The operation that the terminal device determines, according to a hopping pattern of the terminal device, target resources for sending the SRS on the multiple second time-domain resource units may include the following action.

The terminal device determines, based on the frequency-domain resource hopping pattern, an index of each of the multiple second time-domain resource units and a position of a frequency-domain resource for sending the SRS in a first second time-domain resource unit of the multiple second time-domain resource units, a frequency-domain resource for sending the SRS in each second time-domain resource unit.

The frequency-domain resource hopping pattern may be, for example, $f(k)=\text{mod}\,[f(0)+k\times d(i), N]$. $f(k)$ is a frequency-domain start position of a target resource in a second time-domain resource unit with an index k in the first time-domain resource unit, k is a positive integer, $d(i)$ is a hopping parameter obtained based on a hopping ID i, and N is an allowable maximum value of a hopping start position.

In at least one embodiment, in an implementation manner of the first aspect, the target resources are frequency-domain resources for sending the SRS, and the hopping pattern is a frequency-domain resource hopping pattern. The operation that the terminal device determines, according to a hopping pattern of the terminal device, target resources for sending the SRS on the multiple second time-domain resource units may include the following action.

The terminal device determines, based on the frequency-domain resource hopping pattern, an index of each of the multiple second time-domain resource units and an index of the first time-domain resource unit, a frequency-domain resource for sending the SRS in each second time-domain resource unit.

For example, the frequency-domain resource hopping pattern may be $f(k)=\text{mod}\,[g(m)+k\times d(i), N]$. $f(k)$ is a frequency-domain start position of a target resource in a second time-domain resource unit with an index k in the first time-domain resource unit, k is a positive integer, the $d(i)$ is a hopping parameter obtained based on a hopping ID i, $g(m)$ is a value of a frequency-domain resource position obtained based on an index m of the first time-domain resource unit, and N is an allowable maximum value of a hopping start position.

It is to be understood that the frequency-domain resources of different terminal devices for transmitting the SRS in the multiple second time-domain resource units are different. However, when the different terminal devices transmit respective SRSs, a same code-domain resource may be used, and for example, a same root sequence or cyclic shift for generating a respective SRS sequence is used.

It is to be further understood that an initial hopping position of the terminal device in the multiple second time-domain resource units, i.e., a position of a frequency-domain resource for transmitting the SRS in a first second time-domain resource unit of the multiple second time-domain resource units, may be sent to the terminal device by the network device. For example, the network device sends high-level signaling carrying information of the initial hopping position or DCI for triggering transmission of the SRS to the terminal device. The terminal device receives the high-level signaling or the DCI sent by the network device to obtain the initial hopping position in the multiple second time-domain resource units. Alternatively, the terminal device may also determine the initial hopping position in the multiple second time-domain resource units via a hopping pattern between multiple first time-domain resource units. For example, the hopping pattern between the multiple first time-domain resource units is the same as the hopping pattern between the multiple second time-domain resource units. Alternatively, the terminal device may further determine the initial hopping position in the multiple second time-domain resource units according to the index of the first time-domain resource unit.

In at least one embodiment, in an implementation manner of the first aspect, the code resource is at least one of a root sequence for generating an SRS sequence, or a cyclic shift for generating the SRS sequence.

In at least one embodiment, in an implementation manner of the first aspect, the target resources are root sequences for generating SRS sequences, and the hopping pattern is a sequence hopping pattern. The operation that the terminal device determines, according to a hopping pattern of the terminal device, target resources for sending the SRS on the multiple second time-domain resource units may include the following action.

The terminal device determines, based on the sequence hopping pattern and an index of each of the multiple second time-domain resource units, a root sequence of an SRS sequence for sending the SRS in each second time-domain resource unit.

For example, the sequence hopping pattern may be obtained according to a preset pseudorandom sequence, and the root sequence ID of the SRS sequence for transmitting the SRS in a second time-domain resource unit with the index k may be obtained based on the sequence hopping pattern and the index k.

In at least one embodiment, in an implementation manner of the first aspect, the target resources are cyclic shifts for generating SRS sequences, and the hopping pattern is a cyclic shift hopping pattern. The operation that the terminal device determines, according to a hopping pattern of the terminal device, target resources for sending the SRS on the multiple second time-domain resource units may include the following action.

The terminal device determines, based on the cyclic shift hopping pattern and an index of each of the multiple second time-domain resource units, a cyclic shift of an SRS sequence for sending the SRS in each second time-domain resource unit.

For example, the cyclic shift of the SRS sequence for sending the SRS in a second time-domain resource unit with the index k may be obtained based on the cyclic shift hopping pattern and the index k.

It is to be understood that the code resources of different terminal devices for transmitting the SRS in the multiple second time-domain resource units are different. However, when the different terminal devices transmit respective SRSs, a same frequency-domain resource may be used.

In at least one embodiment, in an implementation manner of the first aspect, before the terminal device sends the SRS to a network device according to the target resource, the method may further include the following operation. The terminal device receives DCI sent by the network device. The DCI is to instruct the terminal device to send the SRS, and the DCI includes information of the hopping pattern.

In at least one embodiment, the target resources are time-frequency physical resources, and the terminal device may perform corresponding rate matching or punching on a data channel in the determined target resources.

In at least one embodiment, the target resources are code resources, and the terminal device may perform resource reservation on the determined target resources (i.e., the code resources), and may, for example, reserve corresponding cyclic shifts.

A second aspect provides a method for transmitting an SRS, which may include the following operations. A network device determines multiple second time-domain resource units for receiving an SRS sent by a terminal device within a first time-domain resource unit. The network device determines, according to a hopping pattern of the terminal device, target resources for receiving the SRS on the multiple second time-domain resource units. The network device receives the SRS sent by the terminal device according to the target resource.

Therefore, the network device determines, via the exclusive hopping pattern of the terminal device, resources for receiving the SRS within multiple time-domain resource units for receiving the SRS, so that the interference between SRS signals received from different terminal devices in the multiple time-domain resource units is randomized, the interference of the SRS signals between the different terminal devices is reduced, and the continuous strong interference between the terminal devices is also prevented.

In at least one embodiment, in an implementation manner of the second aspect, the first time-domain resource unit is a slot, a mini-slot or an OFDM symbol.

In at least one embodiment, in an implementation manner of the second aspect, each of the second time-domain resource units is an OFDM symbol.

Specifically, the first time-domain resource unit includes multiple second time-domain resource units. A length of a second time-domain resource unit is smaller than a length of the first time-domain resource. For example, the first time-domain resource unit is a subframe, and the second time-domain resource unit is an OFDM symbol; or, the first time-domain resource unit is an OFDM symbol, and the second time-domain resource unit is an OFDM symbol having a length less than a length of the first time-domain resource unit.

For example, the length of the first time-domain resource unit may be determined according to a sub-carrier spacing for transmitting the data in the first time-domain resource unit, and the length of the second time-domain resource unit may be determined according to a sub-carrier spacing for transmitting the SRS in the first time-domain resource unit.

Also for example, the first time-domain resource unit may be a slot, and the length of the second time-domain resource unit is determined according to a sub-carrier spacing for transmitting the data in the first time-domain resource unit.

In at least one embodiment, the operation that the terminal device determines, multiple second time-domain resource units for sending an SRS of the terminal device within the first time-domain resource unit may include the following actions. The terminal device receives DCI sent by the network device, and the DCI is to indicate the multiple second time-domain resource units for sending the SRS in the first time-domain resource unit. The terminal device determines the multiple second time-domain resource units according to the DCI.

Information on positions, number and the like of the multiple second time-domain resource units may also be agreed between the terminal device and the network device in advance, and may be, for example, agreed in a protocol.

In at least one embodiment, in an implementation manner of the second aspect, each of the target resources is at least one of a frequency-domain resource or a code resource.

In at least one embodiment, in an implementation manner of the second aspect, the target resources are frequency-domain resources for sending the SRS, and the hopping pattern is a frequency-domain resource hopping pattern. The operation that the network device determines, according to a hopping pattern of the terminal device, target resources for receiving the SRS on the multiple second time-domain resource units may include the following action.

The network device determines, based on the frequency-domain resource hopping pattern, an index of each of the multiple second time-domain resource units and a position of a frequency-domain resource for receiving the SRS in a first second time-domain resource unit of the multiple second time-domain resource units, a frequency-domain resource for receiving the SRS in each second time-domain resource unit.

In at least one embodiment, in an implementation manner of the second aspect, the target resources are frequency-domain resources for sending the SRS, and the hopping pattern is a frequency-domain resource hopping pattern. The operation that the network device determines, according to a hopping pattern of the terminal device, target resources for receiving the SRS on the multiple second time-domain resource units may include the following action.

The network device determines, based on the frequency-domain resource hopping pattern, an index of each of the multiple second time-domain resource units and an index of the first time-domain resource unit, a frequency-domain resource for receiving the SRS in each second time-domain resource unit.

In at least one embodiment, in an implementation manner of the second aspect, the code resource is at least one of a root sequence for generating an SRS sequence, or a cyclic shift for generating the SRS sequence.

In at least one embodiment, in an implementation manner of the second aspect, the target resources are root sequences for generating SRS sequences, and the hopping pattern is a sequence hopping pattern. The operation that the network device determines, according to a hopping pattern of the terminal device, target resources for receiving the SRS on the multiple second time-domain resource units may include the following action.

The network device determines, based on the sequence hopping pattern and an index of each of the multiple second time-domain resource units, a root sequence of an SRS sequence for receiving the SRS in each second time-domain resource unit.

In at least one embodiment, in an implementation manner of the second aspect, the target resources are cyclic shifts for generating SRS sequences, and the hopping pattern is a cyclic shift hopping pattern. The operation that the network device determines, according to a hopping pattern of the terminal device, target resources for receiving the SRS on the multiple second time-domain resource units may include the following action.

The network device determines, based on the cyclic shift hopping pattern and an index of each of the multiple second time-domain resource units, a cyclic shift of an SRS sequence for receiving the SRS in each second time-domain resource unit.

In at least one embodiment, in an implementation manner of the second aspect, before the network device receives the SRS sent by the terminal device according to the target resource, the method may further include the following operation. DCI is sent to the terminal device. The DCI is to instruct the terminal device to send the SRS, and the DCI includes information of the hopping pattern.

Specifically, when the network device instructs the terminal device to send the SRS, the network device may further send the indication information to the terminal device simultaneously to indicate the hopping pattern of the terminal device. For example, the network device may send DCI for triggering the SRS to the terminal device, and the DCI may carry a hopping ID (or referred to as an SRS ID).

After receiving the DCI, the terminal device may determine its own hopping pattern according to the hopping ID.

It is to be understood that information on positions, number and the like of the multiple second time-domain resource units may also be agreed between the terminal device and the network device in advance and may be, for example, agreed in a protocol.

A third aspect provides a terminal device, which may execute the operations of the terminal device in the first aspect or any optional implementation manner of the first aspect. Specifically, the terminal device may include modular units configured to execute the operations of the terminal device in the first aspect or any possible implementation manner of the first aspect.

A fourth aspect provides a network device, which may execute the operations of the network device in the second aspect or any optional implementation manner of the second aspect. Specifically, the network device may include modular units configured to execute the operations of the network device in the second aspect or any possible implementation manner of the second aspect.

A fifth aspect provides a terminal device, which may include a processor, a transceiver and a memory. The processor, the transceiver and the memory are communicated to each other via an internal connection path. The memory is configured to store an instruction, and the processor is configured to execute the instruction stored by the memory. When the processor executes the instruction stored by the memory, such execution enables the terminal device to execute the method in the first aspect or any possible implementation manner of the first aspect, or enables the terminal device to implement the terminal device provided in the third aspect.

A sixth aspect provides a network device, which may include a processor, a transceiver and a memory. The processor, the transceiver and the memory are communicated to each other via an internal connection path. The memory is configured to store an instruction, and the processor is configured to execute the instruction stored by the memory. When the processor executes the instruction stored by the memory, such execution enables the network device to execute the method in the second aspect or any possible implementation manner of the second aspect, or enables the network device to implement the network device provided in the fourth aspect.

A seventh aspect provides a computer-readable storage medium, which stores a program. The program enables the network device to execute any method for transmitting the SRS in the first aspect and various implementation manners thereof.

An eighth aspect provides a computer-readable storage medium, which stores a program. The program enables the network device to execute any method for transmitting the SRS in the second aspect and various implementation manners thereof.

A ninth aspect provides a system chip, which may include an input interface, an output interface, a processor and a memory. The processor is configured to execute an instruction stored in the memory. When the instruction is executed, the processor may implement any method in the first aspect and various implementation manners thereof.

A tenth aspect provides a system chip, which may include an input interface, an output interface, a processor and a memory. The processor is configured to execute an instruction stored in the memory. When the instruction is executed, the processor may implement any method in the second aspect and various implementation manners thereof.

Based on the technical solutions provided in the embodiments of the disclosure, the terminal device determines, via its own exclusive hopping pattern, resources for transmitting the SRS in multiple time-domain resource units for transmitting the SRS, so that the interference between different terminal devices for transmitting the SRS in the multiple time-domain resource units is randomized, the interference of the SRS signals between the different terminal devices is reduced, and the continuous strong interference between the terminal devices is also prevented.

DETAILED DESCRIPTION

The technical solutions in the embodiments of the disclosure will be described below in combination with the accompanying drawings.

It should be understood that the technical solutions in the embodiments of the disclosure may be applied in various communications systems, such as a Global System of Mobile communication (abbreviated as "GSM") system, a Code Division Multiple Access (abbreviated as "CDMA") system, a Wideband Code Division Multiple Access (abbreviated as "WCDMA") system, a Long Term Evolution (abbreviated as "LTE") system, an LTE Frequency Division Duplex (abbreviated as "FDD") system, an LTE Time Division Duplex (abbreviated as "TDD") system, a Universal Mobile Telecommunication System (abbreviated as "UMTS") system, future 5G communication system and the like.

Each embodiment is described in the disclosure in combination with a terminal device. The terminal device may also be User Equipment (abbreviated as "UE"), an access terminal, a user unit, a user station, a mobile station, a mobile platform, a remote station, a remote terminal, a mobile device, a user terminal, a terminal, a wireless communication device and a user proxy or user apparatus. The access terminal may be a cellular phone, a cordless telephone, a Session Initiation Protocol (abbreviated as "SIP") phone, a Wireless Local Loop (abbreviated as "WLL") station, a Personal Digital Assistant (abbreviated as "PDA"), a handheld device having a wireless communication function, a computing device or other processing devices connected to a wireless modem, vehicle-mounted devices and wearable devices, a terminal device in a future 5G network or a terminal device in a future evolved Public Land Mobile Network (PLMN) network, etc.

Each embodiment is described in the disclosure in combination with a network device. The network device may be a device used for communicating with the terminal device, and may be, for example, a Base Transceiver Station (abbreviated as "BTS") in a GSM or CDMA, may also be a NodeB (abbreviated as "NB") in a WCDMA system, and may further be an Evolutional NodeB (abbreviated as "eNB" or "eNodeB") in an LTE system; or the network device may be a relay station, an access point, a vehicle-mounted device, a wearable device, a network side device in the future 5G system or a network side device in the future evolved PLMN network, etc.

Figure 1:
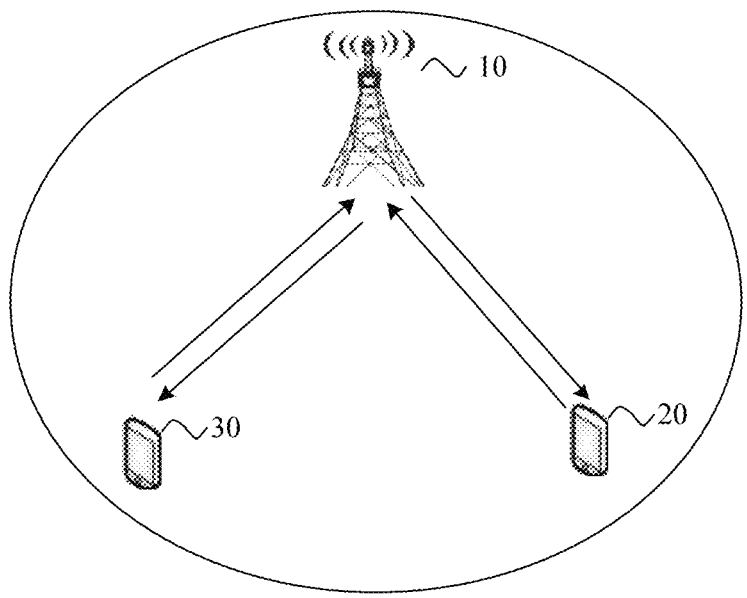
FIG. 1 illustrates a schematic architecture diagram of an application scenario according to an embodiment of the disclosure.

FIG. 1 illustrates a schematic diagram of an application scenario according to an embodiment of the disclosure. The communication system in FIG. 1 may include a network device 10, a terminal device 20 and a terminal device 30. The network device 10 is configured to provide a communication service for the terminal device 20 and the terminal device 30 and is accessed to a core network. The terminal device 20 and the terminal device 30 may be accessed to the network by searching a synchronization signal, a broadcast signal and the like sent by the network device 10 to communicate with the network. The arrows illustrated in FIG. 1 may indicate uplink/downlink transmission via a cellular link between the terminal device 20 and the network device 10 and uplink/downlink transmission via a cellular link between the terminal device 30 and the network device 10.

The network in the embodiments of the disclosure may be a Public Land Mobile Network (abbreviated as "PLMN") or a Device to Device (abbreviated as "D2D") network or a Machine to Machine/Man (abbreviated as "M2M") network or other networks. FIG. 1 is a simplified schematic diagram for example. The network may further include other terminal devices, which is not illustrated in FIG. 1.

Figure 2:
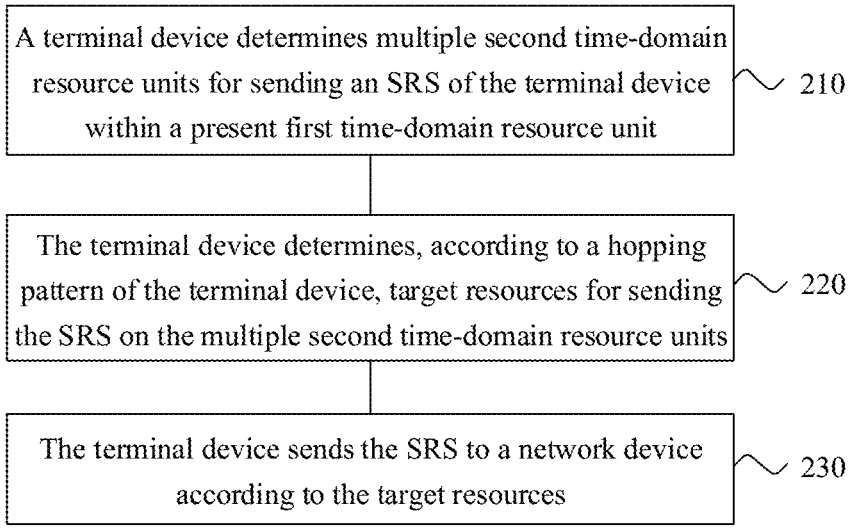
FIG. 2 illustrates a schematic flowchart of a method for transmitting an SRS according to an embodiment of the disclosure.

FIG. 2 illustrates a schematic flowchart of a method 200 for transmitting an SRS according to an embodiment of the disclosure. The method 200 may be executed by a terminal device. As illustrated in FIG. 2, the specific process for transmitting the SRS may include the following operations.

At 210, a terminal device determines multiple second time-domain resource units for sending an SRS of the terminal device within a first time-domain resource unit.

In at least one embodiment, the first time-domain resource unit may be a slot, a mini-slot or an OFDM symbol. Alternatively, the first time-domain resource unit may further be other time-domain resource unit such as a subframe.

In at least one embodiment, each second time-domain resource unit may be a time-domain resource unit such as an OFDM symbol. The length of the second time-domain resource unit may be calculated based on a sub-carrier spacing for transmitting the data in the first time-domain resource unit, and may also be calculated based on a sub-carrier spacing for transmitting the SRS in the first time-domain resource unit. A plurality of sub-carrier spacings are supported in the 5G system. The sub-carrier spacing for transmitting the data is different from the sub-carrier spacing for transmitting the SRS.

For example, the length of the first time-domain resource unit may be determined according to a sub-carrier spacing for transmitting the data in the first time-domain resource unit, and the length of the second time-domain resource unit may be determined according to a sub-carrier spacing for transmitting the SRS in the first time-domain resource unit.

Specifically, the first time-domain resource unit includes multiple second time-domain resource units. A length of a second time-domain resource unit is less than a length of the first time-domain resource. For example, the first time-domain resource unit is a subframe, and the second time-domain resource unit is an OFDM symbol; or the first time-domain resource unit is an OFDM symbol determined according to the sub-carrier spacing for transmitting the data in the first time-domain resource unit, and the second time-domain resource unit is an OFDM symbol determined according to the sub-carrier spacing for transmitting the SRS in the first time-domain resource unit.

Also for example, the first time-domain resource unit may be a slot, and the length of the second time-domain resource unit is determined according to the sub-carrier spacing for transmitting the data in the first time-domain resource unit.

In at least one embodiment, the operation that a terminal device determines multiple second time-domain resource units for sending an SRS of the terminal device within a first time-domain resource unit may include the following action. The terminal device receives DCI sent by a network device, and the DCI is to indicate, in the first time-domain resource unit, the multiple second time-domain resource units for sending the SRS.

It is to be understood that information on positions, number and the like of the multiple second time-domain resource units may be configured by the network device and may be, for example, instructed to the terminal via the DCI, and may also be agreed between the terminal device and the network device in advance and may be, for example, agreed in a protocol.

At 220, the terminal device determines, according to a hopping pattern of the terminal device, target resources for sending the SRS on the multiple second time-domain resource units.

Specifically, the terminal device acquires its own hopping pattern, and determines, according to the hopping pattern, the target resources for transmitting its own SRS in the multiple second time-domain resource units. The hopping pattern indicates a hopping manner that may be used when the terminal device determines the target resources for transmitting the SRS in the multiple second time-domain resource units.

The hopping pattern of the terminal device may be determined by the network device and instructed to the terminal device, and may also be agreed between the terminal device and the network device in advance.

In at least one embodiment, before the terminal device determines, according to a hopping pattern of the terminal device, target resources for sending the SRS on the multiple second time-domain resource units, the method may further include the following operation. The terminal device receives the DCI sent by the network device, and the DCI is to instruct the terminal device to send the SRS. Further, the DCI may further carry the hopping pattern of the terminal device.

For example, the network device may send the DCI to the terminal device, and the DCI is used for instructing the terminal device to send an SRS of the terminal device and indicating a hopping ID (or referred to as an SRS ID) of the terminal device. After receiving the DCI, the terminal device may determine its own hopping pattern according to the hopping ID.

In at least one embodiment, each of the target resources is at least one of a frequency-domain resource or a code resource.

When the target resource is a frequency-domain resource, the terminal device determines that the hopping pattern used by the target resource is a frequency-domain resource hopping pattern. The frequency-domain resource hopping pattern indicates a hopping manner that may be used when the terminal device determines the frequency-domain resources for transmitting the SRS in the multiple second time-domain resource units.

When the target resource is a code resource, the terminal device determines that the hopping pattern used by the target resource is a sequence hopping pattern or a cyclic shift hopping pattern. The sequence hopping pattern indicates a sequence hopping manner that may be used when the terminal device determines a root sequence of an SRS sequence for transmitting the SRS in the multiple second time-domain resource units. The cyclic shift hopping pattern indicates a cyclic shift hopping manner that may be used when the terminal device determines a cyclic shift of the SRS sequence for transmitting the SRS in the multiple second time-domain resource units.

With respect to two cases, i.e., the target resource is the frequency-domain resource or the code resource, the implementation that the terminal device determines the target resources for transmitting the SRS in the multiple second time-domain resource units will be described below in detail.

Case 1 Target Resources are Frequency-Domain Resources

In at least one embodiment, the target resources are frequency-domain resources for sending the SRS, and the hopping pattern is a frequency-domain resource hopping pattern. The operation that the terminal device determines, according to a hopping pattern of the terminal device, target resources for sending the SRS on the multiple second time-domain resource units may include the following action.

The terminal device determines, according to the frequency-domain resource hopping pattern, an index of each second time-domain resource unit and a position of a frequency-domain resource for sending the SRS in a first second time-domain resource unit of the multiple second time-domain resource units, a frequency-domain resource for sending the SRS in each second time-domain resource unit.

Specifically, the hopping pattern of the terminal device indicates a position of the frequency-domain resource for sending the SRS in each second time-domain resource unit, and an association between an index of each second time-domain resource unit and the position of the frequency-domain resource for sending the SRS in the first second time-domain resource unit. The terminal device determines, based on the frequency-domain resource hopping pattern, the index of each of the multiple second time-domain resource units and the position of the frequency-domain resource for transmitting the SRS in the first second time-domain resource unit of the multiple second time-domain resource units (i.e., the initial hopping position of the terminal device in the multiple second time-domain resource units), the position of the frequency-domain resource for transmitting the SRS in each second time-domain resource unit, so as to sequentially acquire the target resources, i.e., the frequency-domain resources for transmitting the SRS, in the multiple second time-domain resource units.

In the embodiment of the disclosure, the frequency-domain resource generally takes a Physical Resource Block (abbreviated as "PRB") as a unit, the position of the frequency-domain resource is indicated by a PRB index and the size of the frequency-domain resource is indicated by the number of PRBs.

For example, it is assumed that the first time-domain resource unit is a slot, and each of the second time-domain resource units is an OFDM symbol. The terminal device may determine, according to Radio Resource Control (abbreviated as "RRC") signaling received from the network device, the number M of OFDM symbols used for sending the SRS in the present slot, and the SRS may be transmitted in the last M OFDM symbols of the slot. The terminal device determines, according to a slot index of the slot, a frequency-domain start position for transmitting the SRS in the first OFDM symbol of the M OFDM symbols. The terminal device determines its own frequency-domain resource hopping pattern according to a hopping ID indicated by the network device via high-level signaling. The terminal device determines, according to the frequency-domain start position for transmitting the SRS in the first OFDM symbol and the frequency-domain resource hopping pattern, a start position of a frequency-domain resource for transmitting the SRS in each of the M OFDM symbols. The terminal device determines, according to the start position of the frequency-domain resource in each OFDM symbol and a preset transmission bandwidth for transmitting the SRS, a frequency-domain resource for transmitting the SRS in each OFDM symbol. At last, the terminal device transmits the SRS on the determined frequency-domain resources in the M OFDM symbols.

The frequency-domain resource hopping pattern may be, for example, $f(k)=\mod[f(0)+k \times d(i), N]$, where $f(k)$ is a start position of a frequency-domain resource for transmitting the SRS in a second time-domain resource unit with an index k in the first time-domain resource unit (generally indicated by a PRB index of a starting PRB for transmitting the SRS in the second time-domain resource unit), k is a positive integer, $d(i)$ is a hopping parameter obtained based on a hopping ID i, and N is a start position of an allowable maximum frequency-domain resource.

Figure 3:
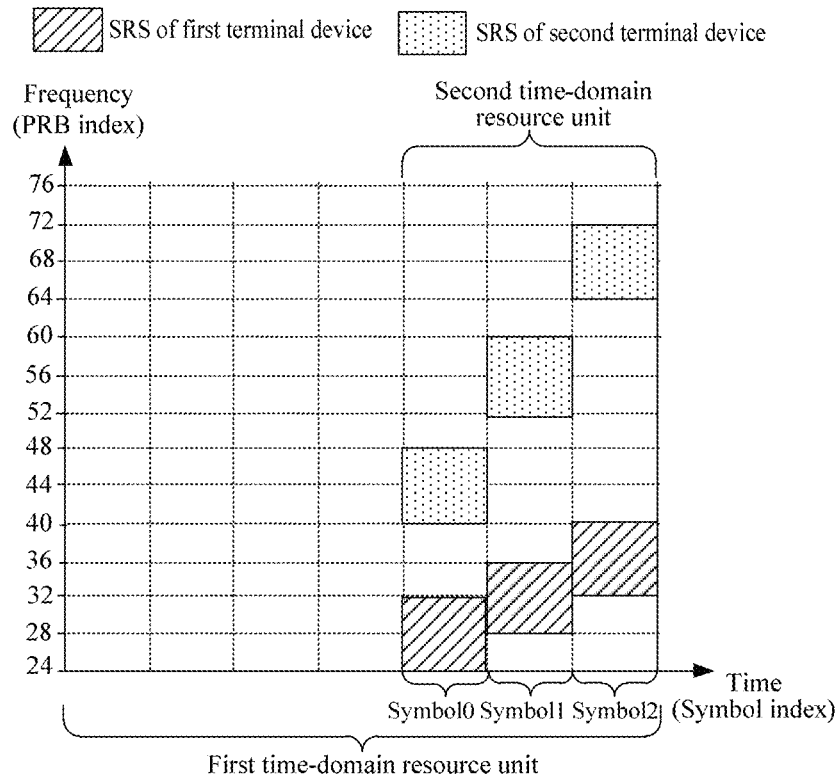
FIG. 3 illustrates a schematic diagram of a hopping pattern according to an embodiment of the disclosure.

For example, in the schematic diagram of a hopping pattern obtained based on a hopping ID i illustrated in FIG. 3, the first time-domain resource unit is a slot, the second time-domain resource unit is an OFDM symbol, the last three symbols in the slot are used for transmitting the SRS, and the preset transmission bandwidth for transmitting the SRS in each symbol is 8 PRBs. At present, two terminal devices (e.g., the terminal device 20 and the terminal device 30 illustrated in FIG. 1) transmit respective SRSs on the three symbols.

For the terminal device 20, it is assumed that $f(0)=24$ (i.e., a PRB index of a PRB for transmitting the SRS in a first symbol of the three OFDM symbols is 24), $d(i)=4$ and $N=100$, the frequency-domain resource hopping pattern of the terminal device 20 is $f(k)=\mod(24+4 \times k, 100)$, where k is a positive integer. Since $f(0)=24$, a start position of a frequency-domain resource for transmitting the SRS on a symbol with the symbol index 0 in the multiple second time-domain resource units is a PRB with the index 24, a start position of a frequency-domain resource for transmitting the SRS on a symbol with the symbol index 1 is a PRB with the index 28, and a start position of a frequency-domain resource for transmitting the SRS on a symbol with the symbol index 2 is a PRB with the index 32.

For the terminal device 30, it is assumed that $f(0)=40$, $d(i)=12$ and $N=100$, the frequency-domain resource hopping pattern of the terminal device 30 is $f(k)=\mod(40+12 \times k, 100)$, where k is a positive integer. Since $f(0)=40$, a start position of a frequency-domain resource for transmitting the SRS on a symbol with the symbol index 0 in the multiple second time-domain resource units is a PRB with the index 40, a start position of a frequency-domain resource for transmitting the SRS on a symbol with the symbol index 1 is a PRB with the index 52, and a start position of a frequency-domain resource for transmitting the SRS on a symbol with the symbol index 2 is a PRB with the index 64.

Therefore, the terminal device 20 and the terminal device 30 both transmit respective SRSs in the multiple second time-domain resource units of the first time-domain resource. However, the parameters such as hopping ID, initial hopping position and allowable maximum value of the frequency-domain start position used by the two terminal devices are not completely the same, so that the hopping pattern of the terminal device 20 is different from the hopping pattern of the terminal device 30 and thus the frequency-domain resources (i.e., the target resources) used for transmitting the SRS in the multiple second time-domain resource units are also different.

Therefore, with the exclusive hopping patterns of the terminal devices, the interference in the process of sending the SRS by the terminal devices is randomized, the interference of the SRS signals between different terminal devices is reduced and the continuous strong interference between the terminal devices is also prevented.

In at least one embodiment, the target resources are frequency-domain resources for sending the SRS, and the hopping pattern is a frequency-domain resource hopping pattern. The operation that the terminal device determines, according to a hopping pattern of the terminal device, target resources for sending the SRS on the multiple second time-domain resource units may include the following action.

The terminal device determines, based on the frequency-domain resource hopping pattern, an index of each of the multiple second time-domain resource units and an index of the first time-domain resource unit, a frequency-domain resource for sending the SRS in each second time-domain resource unit.

Specifically, the hopping pattern of the terminal device indicates a position of the frequency-domain resource for sending the SRS in each second time-domain resource unit, and an association between an index of each second time-domain resource unit and the index of the first time-domain resource unit. The terminal device determines, based on the frequency-domain resource hopping pattern, the index of each second time-domain resource unit in the multiple second time-domain resource units and the index of the first time-domain resource unit, the position of the frequency-domain resource for transmitting the SRS in each second time-domain resource unit, so as to sequentially acquire the target resources, i.e., the frequency-domain resources for sending the SRS, in the multiple second time-domain resource units.

For example, the frequency-domain resource hopping pattern may be $f(k)=\mod[g(m)+k\times d(i), N]$, where $f(k)$ is a frequency-domain start position of a target resource in a second time-domain resource unit with an index k in the first time-domain resource unit, k is a positive integer, $d(i)$ is a hopping parameter obtained based on a hopping ID i, $g(m)$ is a value of a frequency-domain resource position obtained based on an index m of the first time-domain resource unit, and N is a start position of an allowable maximum frequency-domain resource.

In Case 1, the frequency-domain resources determined by different terminal devices for transmitting the SRS in the multiple second time-domain resource units are different. However, when the different terminal devices transmit respective SRSs, a same code domain resource may be used, for example, a same root sequence or cyclic shift for generating respective SRS sequences is used.

It is to be understood that an initial hopping position of the terminal device in the multiple second time-domain resource units, i.e., a position of a frequency-domain resource for transmitting the SRS in a first second time-domain resource unit of the multiple second time-domain resource units, may be sent to the terminal device by the network device. For example, the network device sends high-level signaling carrying information of the initial hopping position or DCI for triggering transmission of the SRS to the terminal device. The terminal device receives the high-level signaling or the DCI sent by the network device to obtain the initial hopping position in the multiple second time-domain resource units.

In at least one alternative example, the terminal device may also determine the initial hopping position in the multiple second time-domain resource units via a hopping pattern between multiple first time-domain resource units. For example, the first time-domain resource unit is a slot, the multiple second time-domain resource units are last three OFDM symbol in the slot, the hopping pattern between multiple slots may be a predefined hopping pattern and the hopping pattern indicates a position of a frequency-domain resource for transmitting the SRS on a third-from-last symbol (a first symbol in the last three symbols) in each slot. The terminal device may directly determine the initial hopping position in the multiple second time-domain resource units according to the hopping pattern.

In at least one alternative example, the terminal device may further determine the initial hopping position in the multiple second time-domain resource units according to the index of the first time-domain resource unit.

Case 2 Target Resources are Code Resources

In at least one embodiment, the code resource is at least one of a root sequence for generating an SRS sequence or a cyclic shift for generating the SRS sequence.

In at least one embodiment, the target resources are root sequences for generating the SRS sequences, and the hopping pattern is a sequence hopping pattern. The operation that the terminal device determines, according to a hopping pattern of the terminal device, target resources for sending the SRS on the multiple second time-domain resource units may include the following action.

The terminal device determines, based on the sequence hopping pattern and an index of each second time-domain resource unit in the multiple second time-domain resource units, a root sequence of an SRS sequence for sending the SRS in each second time-domain resource unit.

Specifically, the hopping pattern of the terminal device indicates an association between the root sequence of the SRS sequence for sending the SRS in each second time-domain resource unit and an index of each second time-domain resource unit. The terminal device determines, based on the sequence hopping pattern and the index of each second time-domain resource unit in the multiple second time-domain resource units, the root sequence of the SRS sequence for transmitting the SRS in each second time-domain resource unit, so as to sequentially acquire the target resources, i.e., the root sequences of the SRS sequences for transmitting the SRS, in the multiple second time-domain resource units.

For example, the sequence hopping pattern may be obtained according to a preset pseudorandom sequence, and the root sequence ID of the SRS sequence for transmitting the SRS in a second time-domain resource unit with the index k may be obtained based on the sequence hopping pattern and the index k. For example, the root sequence ID of the SRS sequence for transmitting the SRS in the second time-domain resource unit with the index k may be equal to f(k), i.e., a variable relevant to k.

For example, it is assumed that the first time-domain resource unit is a first OFDM symbol, the second time-domain resource unit is a second OFDM symbol and a length of the second OFDM symbol is less than a length of the first OFDM symbol. The terminal device determines, according to the received DCI, an index K of a first OFDM symbol for sending an aperiodic SRS in a present slot. The terminal device determines, according to a sub-carrier spacing used for transmitting the SRS, the number M of second OFDM symbols for transmitting the SRS included in the first OFDM symbol with the index K. For example, when the reference sub-carrier spacing of the present slot is 15 kHz and the sub-carrier spacing used for transmitting the aperiodic SRS is 60 kHz, the first OFDM symbol may include four second OFDM symbols for transmitting the SRS, i.e., M=4. The terminal device performs sequence initialization according to a preconfigured hopping ID, and generates a sequence hopping pattern based on a pseudorandom sequence. The terminal device determines, according to the sequence hopping pattern and an index of each second OFDM symbol for transmitting the SRS in the first OFDM symbol, a root sequence ID of a sequence for transmitting the SRS in each second OFDM symbol. The terminal device generates an SRS sequence of each second OFDM symbol according to the root sequence ID for transmitting the SRS in each second OFDM symbol. The terminal device sends an SRS signal generated based on the SRS sequence on a resource configured by the network device.

In at least one embodiment, the target resources are the cyclic shifts for generating SRS sequences, and the hopping pattern is a cyclic shift hopping pattern. The operation that the terminal device determines, according to a hopping pattern of the terminal device, target resources for sending the SRS on the multiple second time-domain resource units may include the following action.

The terminal device determines, based on the cyclic shift hopping pattern and an index of each second time-domain resource unit in the multiple second time-domain resource units, a cyclic shift of an SRS sequence for sending the SRS in each second time-domain resource unit.

Specifically, the hopping pattern of the terminal device indicates an association between the cyclic shift of the SRS sequence for sending the SRS in each second time-domain resource unit and an index of each second time-domain resource unit. The terminal device determines, based on the cyclic shift hopping pattern and the index of each second time-domain resource unit in the multiple second time-domain resource units, the cyclic shift of the SRS sequence for transmitting the SRS in each second time-domain resource unit, so as to sequentially acquire the target resources, i.e., the cyclic shifts of the SRS sequences for transmitting the SRS, in the multiple second time-domain resource units.

For example, the cyclic shift of the SRS sequence for sending the SRS in a second time-domain resource unit with the index k may be obtained based on the cyclic shift hopping pattern and the index k. For example, the cyclic shift of the SRS sequence for transmitting the SRS in the second time-domain resource unit with the index k may be equal to f(k), i.e., a variable relevant to k.

In Case 2, the code resources determined by different terminal devices for transmitting the SRS in the multiple second time-domain resource units are different. However, when different terminal devices transmit respective SRSs, a same frequency-domain resource may be used.

At 230, the terminal device sends the SRS to a network device according to the target resources.

Specifically, the terminal device determines, according to its own exclusive hopping pattern, the target resources for transmitting the SRS in the multiple second time-domain resource units and then may send the SRS to the network device according to the target resources.

In at least one embodiment, the target resources are time-frequency physical resources, and the terminal device may perform corresponding rate matching or punching on a data channel on the determined target resources.

In at least one embodiment, the target resources are code resources, and the terminal device may perform resource reservation on the determined target resources (i.e., the code resources), and may, for example, reserve a corresponding cyclic shift.

Therefore, the terminal device determines, via its own exclusive hopping pattern, resources for sending the SRS on multiple time-domain resource units, so that the interference between different terminal devices for transmitting the SRS in the multiple time-domain resource units is randomized Therefore, the interference of the SRS signals between the different terminal devices is reduced, and the continuous strong interference between the terminal devices is also prevented.

Figure 4:
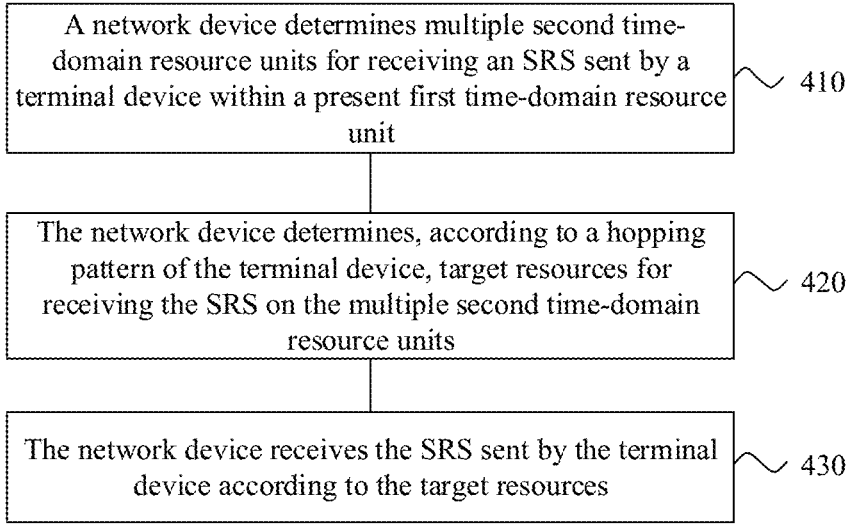
FIG. 4 illustrates a schematic flowchart of a method for transmitting an SRS according to an embodiment of the disclosure.

FIG. 4 illustrates a schematic flowchart of a method 400 for transmitting SRS according to an embodiment of the disclosure. The method 400 is executed by a network device. As illustrated in FIG. 4, the specific process for transmitting the SRS may include the following operations.

At 410, a network device determines multiple second time-domain resource units for receiving an SRS sent by a terminal device within a first time-domain resource unit.

In at least one embodiment, the first time-domain resource unit may be a slot, a mini-slot or an OFDM symbol. Alternatively, the first time-domain resource unit may further be other time-domain resource unit such as a subframe.

In at least one embodiment, each second time-domain resource unit may be a time-domain resource unit such as an OFDM symbol. The length of the second time-domain resource unit may be calculated based on a sub-carrier spacing for transmitting the data in the first time-domain resource unit, and may also be calculated based on a sub-carrier spacing for transmitting the SRS in the first time-domain resource unit. A plurality of sub-carrier spacings are supported in the 5G system. The sub-carrier spacing for transmitting the data is different from the sub-carrier spacing for transmitting the SRS.

Specifically, the first time-domain resource unit includes multiple second time-domain resource units. A length of a second time-domain resource unit is less than a length of the first time-domain resource. For example, the first time-domain resource unit is a subframe, and the second time-domain resource unit is an OFDM symbol; or, the first time-domain resource unit is an OFDM symbol, and the second time-domain resource unit is an OFDM symbol having a length less than a length of the first time-domain resource unit.

For example, the length of the first time-domain resource unit may be determined according to a sub-carrier spacing for transmitting the data in the first time-domain resource unit, and the length of the second time-domain resource unit may be determined according to a sub-carrier spacing for transmitting the SRS in the first time-domain resource unit.

Also for example, the first time-domain resource unit may be a slot, and the length of the second time-domain resource unit is determined according to the sub-carrier spacing for transmitting the data in the first time-domain resource unit.

At 420, the network device determines, according to a hopping pattern of the terminal device, target resources for receiving the SRS on the multiple second time-domain resource units.

Specifically, the network device determines, according to the hopping pattern of the terminal device, the target resources for receiving the SRS of the terminal device in the multiple second time-domain resource units. The hopping pattern indicates a hopping manner that may be used when the terminal device determines the target resources for transmitting the SRS in the multiple second time-domain resource units.

The hopping pattern of the terminal device may be determined by the network device and instructed to the terminal device, and may also be agreed between the terminal device and the network device in advance.

In at least one embodiment, each target resource is at least one of a frequency-domain resource or a code resource.

When the target resource is a frequency-domain resource, the network device determines that the hopping pattern used by the target resource is a frequency-domain resource hopping pattern. The frequency-domain resource hopping pattern indicates a hopping manner that may be used when the terminal device determines the frequency-domain resources for transmitting the SRS in the multiple second time-domain resource units.

In at least one embodiment, the target resources are frequency-domain resources for sending the SRS, and the hopping pattern is a frequency-domain resource hopping pattern. The operation that the network device determines, according to a hopping pattern of the terminal device, target resources for receiving the SRS on the multiple second time-domain resource units may include the following action.

The network device determines, based on the frequency-domain resource hopping pattern, an index of each second time-domain resource unit and a position of a frequency-domain resource for receiving the SRS in a first second time-domain resource unit of the multiple second time-domain resource units, a frequency-domain resource for receiving the SRS in each second time-domain resource unit.

The frequency-domain resource hopping pattern may be, for example, $f(k)=\mod [f(0)+k \times d(i), N]$, where $f(k)$ is a frequency-domain start position of a target resource in a second time-domain resource unit with an index k in the first time-domain resource unit, k is a positive integer, $d(i)$ is a hopping parameter obtained based on a hopping ID i, and N is a value of a start position of an allowable maximum frequency-domain resource.

In at least one embodiment, the target resources are frequency-domain resources for sending the SRS, and the hopping pattern is a frequency-domain resource hopping pattern. The operation that the network device determines, according to a hopping pattern of the terminal device, target resources for receiving the SRS on the multiple second time-domain resource units may include the following action.

The network device determines, based on the frequency-domain resource hopping pattern, an index of each second time-domain resource unit and an index of the first time-domain resource unit, a frequency-domain resource for receiving the SRS in each second time-domain resource unit.

For example, the frequency-domain resource hopping pattern may be $f(k)=\mod [g(m)+k \times d(i), N]$, where $f(k)$ is a frequency-domain start position of a target resource in a second time-domain resource unit with an index k in the first time-domain resource unit, k is a positive integer, $d(i)$ is a hopping parameter obtained based on a hopping ID i, $g(m)$ is a value of a frequency-domain resource position obtained based on an index m of the first time-domain resource unit, and N is value of a start position of an allowable maximum frequency-domain resource.

In at least one embodiment, the code resource is at least one of a root sequence for generating an SRS sequence or a cyclic shift for generating the SRS sequence.

When the target resource is the code resource, the network device determines that the hopping pattern used by the target resource is a sequence hopping pattern or a cyclic shift hopping pattern. The sequence hopping pattern indicates a sequence hopping manner that may be used when the network device determines root sequences of SRS sequences for transmitting the SRS in the multiple second time-domain resource units. The cyclic shift hopping pattern indicates a cyclic shift hopping manner that may be used when the network device determines cyclic shifts of the SRS sequences for transmitting the SRS in the multiple second time-domain resource units.

In at least one embodiment, the target resources are the root sequences for generating the SRS sequences, and the hopping pattern is a sequence hopping pattern. The operation that the network device determines, according to a hopping pattern of the network device, target resources for receiving the SRS on the multiple second time-domain resource units may include the following action.

The network device determines, based on the sequence hopping pattern and an index of each second time-domain resource unit, a root sequence of an SRS sequence for receiving the SRS in each second time-domain resource unit.

For example, the sequence hopping pattern may be obtained according to a preset pseudorandom sequence, and the root sequence ID of the SRS sequence for transmitting the SRS in a second time-domain resource unit with the index k may be obtained based on the sequence hopping pattern and the index k.

In at least one embodiment, the target resources are the cyclic shifts for generating the SRS sequences, and the hopping pattern is a cyclic shift hopping pattern. The operation that the network device determines, according to a hopping pattern of the terminal device, target resources for receiving the SRS on the multiple second time-domain resource units may include the following action.

The network device determines, based on the cyclic shift hopping pattern and an index of each second time-domain resource unit in the multiple second time-domain resource units, a cyclic shift of an SRS sequence for receiving the SRS in each second time-domain resource unit.

For example, the cyclic shift of the SRS sequence for transmission of the SRS in a second time-domain resource unit with the index k may be obtained based on the cyclic shift hopping pattern and the index k.

For the two cases that the target resource is the frequency-domain resource or the code resource, the procedure that the network device determines the target resources for receiving the SRS in the multiple second time-domain resource units may be specifically referred to the above description on the terminal device in Case 1 and Case 2 in 220, and will not be elaborated herein for the briefness.

At 430, the network device receives the SRS sent by the terminal device according to the target resources.

Specifically, the network device determines the target resources for receiving the SRS of the terminal in the multiple second time-domain resource units and then receives the SRS of the terminal device sent by the terminal device on the target resources.

In the embodiment, the network device determines, via an exclusive hopping pattern of the terminal device, resources for receiving the SRS from multiple time-domain resource units for receiving the SRS, so that the interference between SRS signals received from different terminal devices in the multiple time-domain resource units is randomized Therefore, the interference of the SRS signals between the different terminal devices is reduced, and the continuous strong interference between the terminal devices is also prevented.

In at least one embodiment, before the network device receives, according to the target resources, the SRS sent by the terminal device, the method may further include the following operation. The network device sends DCI to the terminal device. The DCI is to instruct the terminal device to send the SRS, and the DCI includes information of the hopping pattern.

Specifically, when the network device instructs the terminal device to send the SRS, the network device may simultaneously send the indication information to the terminal device to indicate the hopping pattern of the terminal device. For example, the network device may send DCI for triggering the SRS to the terminal device, and the DCI may carry a hopping ID (or referred to as an SRS ID). After receiving the DCI, the terminal device may determine its own hopping pattern according to the hopping ID.

Figure 5:
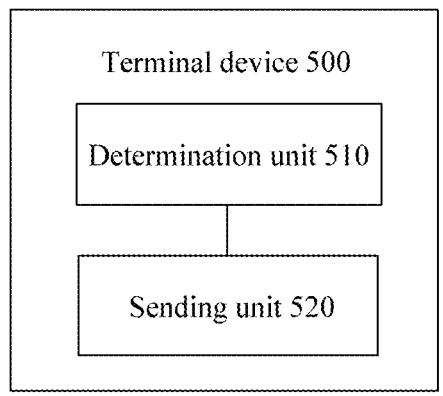
FIG. 5 illustrates a schematic block diagram of a terminal device according to an embodiment of the disclosure.

FIG. 5 illustrates a schematic block diagram of a terminal device 500 according to an embodiment of the disclosure. As illustrated in FIG. 5, the terminal device 500 may include a determination unit 510 and a sending unit 520.

The determination unit 510 is configured to determine multiple second time-domain resource units for sending an SRS of the terminal device within a first time-domain resource unit.

The determination unit 510 is further configured to determine, according to a hopping pattern of the terminal device, target resources for sending the SRS on the multiple second time-domain resource units.

The sending unit 520 is configured to send the SRS to a network device according to the target resources determined by the determination unit 510.

Therefore, the terminal device determines, via its own exclusive hopping pattern, resources for sending the SRS on multiple time-domain resource units, so that the interference between different terminal devices for transmitting the SRS in the multiple time-domain resource units is randomized, thereby reducing the interference of the SRS signals between the different terminal devices and further avoiding the continuous strong interference between the terminal devices.

In at least one embodiment, the first time-domain resource unit is a slot, a mini-slot or an OFDM symbol.

In at least one embodiment, each of the second time-domain resource units is an OFDM symbol.

In at least one embodiment, each of the target resources is at least one of a frequency-domain resource or a code resource.

In at least one embodiment, the target resources are frequency-domain resources for sending the SRS, and the hopping pattern is a frequency-domain resource hopping pattern.

The determination unit 510 is specifically configured to determine, based on the frequency-domain resource hopping pattern, an index of each second time-domain resource unit in the multiple second time-domain resource units and a position of a frequency-domain resource for sending the SRS in a first second time-domain resource unit of the multiple second time-domain resource units, a frequency-domain resource for sending the SRS in each second time-domain resource unit.

In at least one embodiment, the target resources are frequency-domain resources for sending the SRS, and the hopping pattern is a frequency-domain resource hopping pattern.

The determination unit 510 is specifically configured to determine, based on the frequency-domain resource hopping pattern, an index of each second time-domain resource unit in the multiple second time-domain resource units and an index of the first time-domain resource unit, a frequency-domain resource for sending the SRS in each second time-domain resource unit.

In at least one embodiment, the code resource is at least one of a root sequence for generating an SRS sequence or a cyclic shift for generating the SRS sequence.

In at least one embodiment, the target resources are root sequences for generating the SRS sequences, and the hopping pattern is a sequence hopping pattern.

The determination unit 510 is specifically configured to determine, based on the sequence hopping pattern and an index of each second time-domain resource unit in the multiple second time-domain resource units, a root sequence of an SRS sequence for sending the SRS in each second time-domain resource unit.

In at least one embodiment, the target resources are the cyclic shifts for generating the SRS sequences, and the hopping pattern is a cyclic shift hopping pattern.

The determination unit 510 is specifically configured to determine, based on the cyclic shift hopping pattern and an index of each second time-domain resource unit in the multiple second time-domain resource units, a cyclic shift of an SRS sequence for sending the SRS in each second time-domain resource unit.

In at least one embodiment, the terminal device may further include a sending unit. The sending unit is configured to receive DCI sent by the network device before sending the SRS to the network device according to the target resources. The DCI is used for instructing the terminal device to send the SRS, and the DCI includes information of the hopping pattern.

It is to be understood that the terminal device 500 may correspond to the terminal device in the method embodiment, and may implement corresponding functions of the terminal device, which will not be elaborated herein for the briefness.

Figure 6:
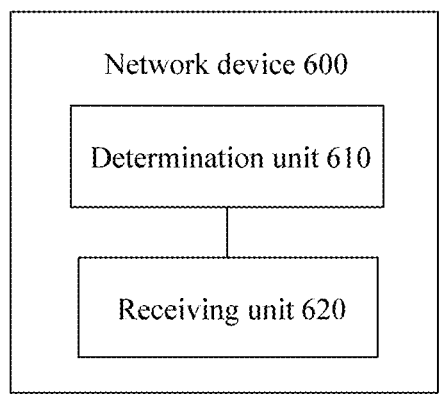
FIG. 6 illustrates a schematic block diagram of a network device according to an embodiment of the disclosure.

FIG. 6 illustrates a schematic block diagram of a network device 600 according to an embodiment of the disclosure. As illustrated in FIG. 6, the network device 600 may include a determination unit 610 and a receiving unit 620.

The determination unit 610 is configured to determine multiple second time-domain resource units for receiving an SRS sent by a terminal device within a first time-domain resource unit.

The determination unit 610 is further configured to determine, according to a hopping pattern of the terminal device, target resources for receiving the SRS on the multiple second time-domain resource units.

The receiving unit 620 is configured to receive the SRS sent by the terminal device according to the target resources determined by the determination unit 610. Therefore, the network device determines, via an exclusive hopping pattern of the terminal device, resources for receiving the SRS from multiple time-domain resource units for receiving the SRS, so that the interference between SRS signals received from different terminal devices in the multiple time-domain resource units is randomized, thereby reducing the interference of the SRS signals between the different terminal devices, and further avoiding the continuous strong interference between the terminal devices.

In at least one embodiment, the first time-domain resource unit is a slot, a mini-slot or an OFDM symbol.

In at least one embodiment, each of the second time-domain resource units is an OFDM symbol.

In at least one embodiment, each of the target resource is at least one of a frequency-domain resource or a code resource.

In at least one embodiment, the target resources are frequency-domain resources for sending the SRS, and the hopping pattern is a frequency-domain resource hopping pattern.

The determination unit 610 is specifically configured to determine, based on the frequency-domain resource hopping pattern, an index of each second time-domain resource unit in the multiple second time-domain resource units and a position of a frequency-domain resource for receiving the SRS in a first second time-domain resource unit of the multiple second time-domain resource units, a frequency-domain resource for receiving the SRS in each second time-domain resource unit.

In at least one embodiment, the target resources are frequency-domain resources for sending the SRS, and the hopping pattern is a frequency-domain resource hopping pattern.

The determination unit 610 is specifically configured to determine, based on the frequency-domain resource hopping pattern, an index of each second time-domain resource unit in the multiple second time-domain resource units and an index of the first time-domain resource unit, a frequency-domain resource for receiving the SRS in each second time-domain resource unit.

In at least one embodiment, the code resource is at least one of a root sequence for generating an SRS sequence or a cyclic shift for generating the SRS sequence.

In at least one embodiment, the target resources are root sequences for generating the SRS sequences, and the hopping pattern is a sequence hopping pattern.

The determination unit 610 is specifically configured to determine, based on the sequence hopping pattern and an index of each second time-domain resource unit in the multiple second time-domain resource units, a root sequence of an SRS sequence for receiving the SRS in each second time-domain resource unit.

In at least one embodiment, the target resources are cyclic shifts for generating the SRS sequences, and the hopping pattern is a cyclic shift hopping pattern.

The determination unit 610 is specifically configured to determine, based on the cyclic shift hopping pattern and an index of each second time-domain resource unit in the multiple second time-domain resource units, a cyclic shift of an SRS sequence for receiving the SRS in each second time-domain resource unit.

In at least one embodiment, the network device may further include a sending unit. The sending unit is configured to send DCI to the terminal device before the SRS sent by the terminal device is received according to the target resource. The DCI is used for instructing the terminal device to send the SRS, and the DCI includes information of the hopping pattern.

Figure 7:
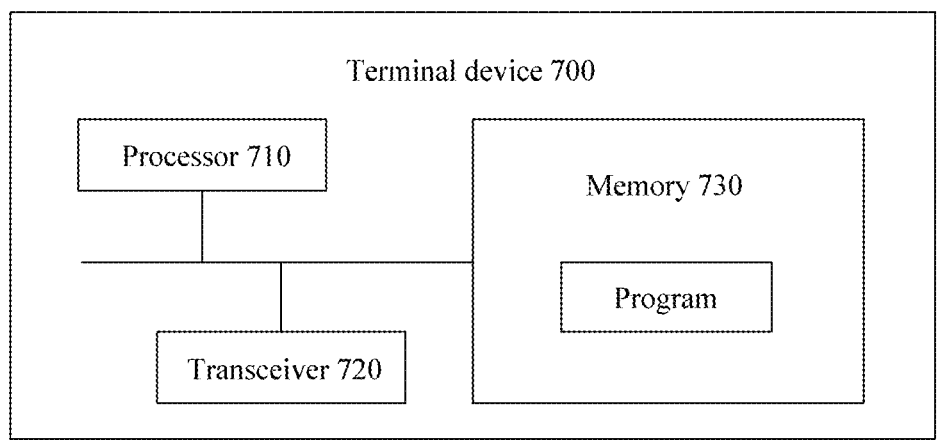
FIG. 7 illustrates a schematic diagram of a terminal device according to an embodiment of the disclosure.

FIG. 7 illustrates a schematic diagram of a terminal device 700 according to an embodiment of the disclosure. As illustrated in FIG. 7, the terminal device may include a processor 710, a transceiver 720 and a memory 730. The processor 710, the transceiver 720 and the memory 730 are communicated to each other via an internal connection path. The memory 730 is configured to store an instruction. The processor 710 is configured to execute the instruction stored in the memory 730 to control the transceiver 720 to receive a signal or send the signal.

The processor 710 is configured to determine multiple second time-domain resource units for sending an SRS of the terminal device within a first time-domain resource unit, and determine, according to a hopping pattern of the terminal device, target resources for sending the SRS on the multiple second time-domain resource units.

The transceiver 720 is configured to send the SRS to a network device according to the target resources determined by the processor 710.

Therefore, the terminal device determines, via its own exclusive hopping pattern, resources for sending the SRS on multiple time-domain resource units, so that the interference between different terminal devices for transmitting the SRS in the multiple time-domain resource units is randomized, thereby reducing the interference of the SRS signals between the different terminal devices, and further avoiding the continuous strong interference between the terminal devices.

In at least one embodiment, the first time-domain resource unit is a slot, a mini-slot or an OFDM symbol.

In at least one embodiment, each of the second time-domain resource units is an OFDM symbol.

In at least one embodiment, each of the target resources is at least one of a frequency-domain resource or a code resource.

In at least one embodiment, the target resources are frequency-domain resources for sending the SRS, and the hopping pattern is a frequency-domain resource hopping pattern.

The processor 710 is specifically configured to determine, based on the frequency-domain resource hopping pattern, an index of each second time-domain resource unit in the multiple second time-domain resource units and a position of a frequency-domain resource for sending the SRS in a first second time-domain resource unit of the multiple second time-domain resource units, a frequency-domain resource for sending the SRS in each second time-domain resource unit.

In at least one embodiment, the target resources are frequency-domain resources for sending the SRS, and the hopping pattern is a frequency-domain resource hopping pattern.

The processor 710 is specifically configured to determine, based on the frequency-domain resource hopping pattern, an index of each second time-domain resource unit in the multiple second time-domain resource units and an index of the first time-domain resource unit, a frequency-domain resource for sending the SRS in each second time-domain resource unit.

In at least one embodiment, the code resource is at least one of a root sequence for generating an SRS sequence or a cyclic shift for generating the SRS sequence. In at least one embodiment, the target resources are root sequences for generating the SRS sequences, and the hopping pattern is a sequence hopping pattern.

The processor 710 is specifically configured to determine, based on the sequence hopping pattern and an index of each second time-domain resource unit in the multiple second time-domain resource units, a root sequence of an SRS sequence for sending the SRS in each second time-domain resource unit.

In at least one embodiment, the target resources are cyclic shifts for generating the SRS sequences, and the hopping pattern is a cyclic shift hopping pattern.

The processor 710 is specifically configured to determine, based on the cyclic shift hopping pattern and an index of each second time-domain resource unit in the multiple second time-domain resource units, a cyclic shift of an SRS sequence for sending the SRS in each second time-domain resource unit.

In at least one embodiment, the transceiver 720 is further configured to: receive, before sending the SRS to the network device according to the target resources, DCI sent by the network device. The DCI is used for instructing the terminal device to send the SRS, and the DCI includes information of the hopping pattern.

It should be understood that in the embodiment of the disclosure, the processor 710 may be a Central Processing Unit (abbreviated as "CPU"). The processor 710 may further be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor, etc.

The memory 730 may include a Read Only Memory (ROM) and a Random Access Memory (RAM) and provides instructions and data for the processor 710. A part of the memory 730 may further include a nonvolatile RAM. For example, the memory 730 may further store information on a type of a storage device.

During an implementation process, each operation of the above methods may be accomplished via an integrated logic circuit of hardware in the processor 710 or an instruction in a software form. The operations of the positioning methods disclosed in combination the embodiments of the disclosure may be directly executed and accomplished by a hardware processor or may be executed and accomplished by a combination of hardware and software modules in the processor 710. The software module may be located in a mature storage medium in the art, such as an RAM, a flash memory, an ROM, a Programmable ROM (PROM), an Electrically EPROM (EEPROM) or a register. The storage medium is located in the memory 730. The processor 710 reads information from the memory 730 and completes the operations of the foregoing methods in combination with the hardware of the processor, which will not be elaborated herein to avoid repetition.

The terminal device 700 according to the embodiment of the disclosure may correspond to the terminal device for executing the method 200 in the method 200 and the terminal device 500 according to the embodiments of the disclosure. Each unit or module in the terminal device 700 is respectively configured to execute each action or operation executed by the terminal device in the method 200. Herein, the detailed description is omitted to avoid repetition.

Figure 8:
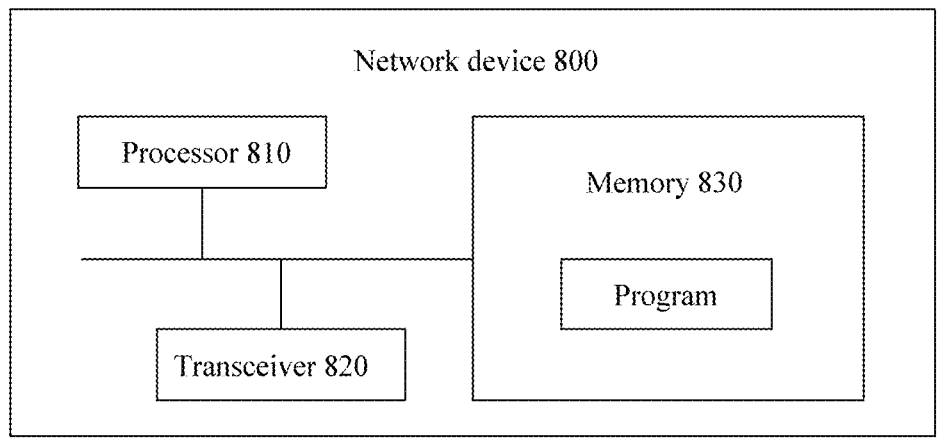
FIG. 8 illustrates a schematic diagram of a network device according to an embodiment of the disclosure.

FIG. 8 illustrates a schematic diagram of a network device 800 according to an embodiment of the disclosure. As illustrated in FIG. 8, the network device may include a processor 810, a transceiver 820 and a memory 830. The processor 810, the transceiver 820 and the memory 830 are communicated to each other via an internal connection path. The memory 830 is configured to store an instruction. The processor 810 is configured to execute the instruction stored in the memory 830 to control the transceiver 820 to receive a signal or send the signal.

The processor 810 is configured to determine multiple second time-domain resource units for receiving an SRS sent by a terminal device within a first time-domain resource unit, and determine, according to a hopping pattern of the terminal device, target resources for receiving the SRS on the multiple second time-domain resource units.

The transceiver 820 is configured to receive, according to the target resources determined by the processor 810, the SRS sent by the terminal device.

Therefore, the network device determines, via the exclusive hopping pattern of the terminal device, resources for receiving the SRS in multiple time-domain resource units for receiving the SRS, so that the interference between SRS signals received from different terminal devices in the multiple time-domain resource units is randomized, the interference of the SRS signals between the different terminal devices is reduced, and the continuous strong interference between the terminal devices is also prevented.

In at least one embodiment, the first time-domain resource unit is a slot, a mini-slot or an OFDM symbol.

In at least one embodiment, each of the second time-domain resource units is an OFDM symbol.

In at least one embodiment, each target resource is at least one of a frequency-domain resource or a code resource.

In at least one embodiment, the target resources are frequency-domain resources for sending the SRS, and the hopping pattern is a frequency-domain resource hopping pattern.

The processor 810 is specifically configured to determine, based on the frequency-domain resource hopping pattern, an index of each second time-domain resource unit in the multiple second time-domain resource units and a position of a frequency-domain resource for sending the SRS in a first second time-domain resource unit of the multiple second time-domain resource units, a frequency-domain resource for receiving the SRS in each second time-domain resource unit.

In at least one embodiment, the target resources are frequency-domain resources for sending the SRS, and the hopping pattern is a frequency-domain resource hopping pattern.

The processor 810 is specifically configured to determine, based on the frequency-domain resource hopping pattern, an index of each second time-domain resource unit in the multiple second time-domain resource units and an index of the first time-domain resource unit, a frequency-domain resource for receiving the SRS in each second time-domain resource unit.

In at least one embodiment, the code resource is at least one of a root sequence for generating an SRS sequence or a cyclic shift for generating the SRS sequence.

In at least one embodiment, the target resources are root sequences for generating the SRS sequences, and the hopping pattern is a sequence hopping pattern.

The processor 810 is specifically configured to determine, based on the sequence hopping pattern and an index of each second time-domain resource unit in the multiple second time-domain resource units, a root sequence of an SRS sequence for receiving the SRS in each second time-domain resource unit.

In at least one embodiment, the target resources are cyclic shifts for generating the SRS sequences, and the hopping pattern is a cyclic shift hopping pattern.

The processor 810 is specifically configured to determine, based on the cyclic shift hopping pattern and an index of each second time-domain resource unit in the multiple second time-domain resource units, a cyclic shift of an SRS sequence for receiving the SRS in each second time-domain resource unit.

In at least one embodiment, the transceiver 820 is further configured to send, before receiving the SRS sent by the terminal device according to the target resources, DCI to the terminal device. The DCI is used for instructing the terminal device to send the SRS, and the DCI includes information of the hopping pattern.

It should be understood that in the embodiment of the disclosure, the processor 810 may be a Central Processing Unit (abbreviated as "CPU"). The processor 810 may further be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor, etc.

The memory 830 may include an ROM and an RAM and provides instructions and data for the processor 810. A part of the memory 830 may further include a nonvolatile RAM. For example, the memory 830 may further store information on a type of a storage device.

During an implementation process, each operation of the above methods may be accomplished via an integrated logic circuit of hardware in the processor 810 or an instruction in a software form. The operations of the positioning methods disclosed in combination the embodiments of the disclosure may be directly executed and accomplished by a hardware processor or may be executed and accomplished by a combination of hardware and software modules in the processor 810. The software module may be located in a mature storage medium in the art, such as an RAM, a flash memory, an ROM, a PROM, an EEPROM or a register. The storage medium is located in the memory 830. The processor 810 reads information from the memory 830 and completes the operations of the foregoing methods in combination with the hardware of the processor, which will not be elaborated herein to avoid repetition.

The network device 800 according to the embodiment of the disclosure may correspond to the network device for executing the method 400 in the method 400 and the network device 600 according to the embodiments of the disclosure. Each unit or module in the network device 800 is respectively configured to execute each action or operation executed by the network device in the method 400. Herein, the detailed description is omitted to avoid repetition.

Figure 9:
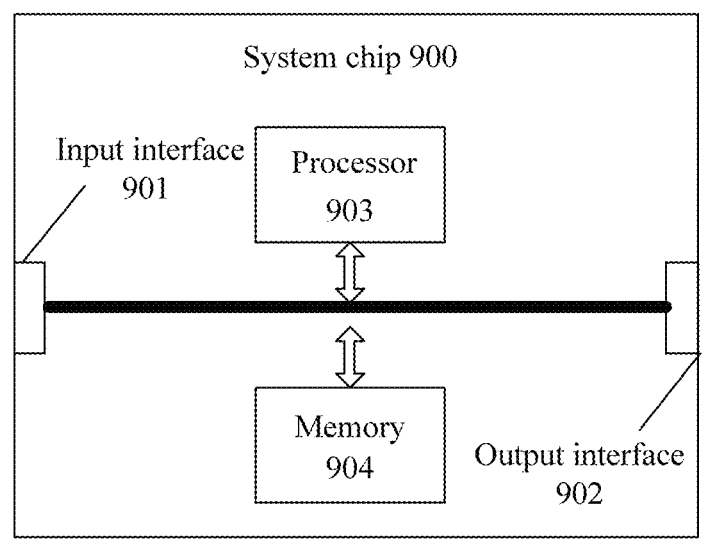
FIG. 9 illustrates a schematic diagram of a system chip according to an embodiment of the disclosure.

FIG. 9 illustrates a schematic diagram of a system chip according to an embodiment of the disclosure. The system chip 900 in FIG. 9 includes an input interface 901, an output interface 902, at least one processor 903 and a memory 904. The input interface 901, the output interface 902, the at least one processor 903 and the memory 904 are connected to each other via an internal connection path. The processor 903 is configured to execute a code in the memory 904.

In at least one embodiment, when the code is executed, the processor 903 may implement the method executed by the terminal device in the method embodiments. The above will not be elaborated for the briefness.

In at least one embodiment, when the code is executed, the processor 903 may implement the method executed by the network device in the method embodiment. The above will not be elaborated for the briefness.

It is to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, an ROM, an RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting a sounding reference signal (SRS), comprising:
    receiving, by a terminal device, Radio Resource Control (RRC) signaling from a network device;
    determining, by the terminal device according to the RRC signaling, a number M of multiple second time-domain resource units within a first time-domain unit for transmitting the SRS, wherein the first time-domain resource unit is a slot, the multiple second time-domain resource units are multiple symbols and M is an integer;
    determining, by the terminal device according to a hopping pattern, target frequency-domain resources for transmitting the SRS on each of the M second time-domain resource units determined by the RRC signaling; and
    transmitting, by the terminal device on the M second time-domain resource units, the SRS to the network device according to the target frequency-domain resources;
    wherein the hopping pattern is a frequency-domain resource hopping pattern;
    determining, by the terminal device according to the hopping pattern, target frequency-domain resources for transmitting the SRS on each of the M second time-domain resource units comprises:
    determining, by the terminal device according to the frequency-domain resource hopping pattern, an index of each of the M second time-domain resource units and an index of the first time-domain resource unit, a frequency-domain resource for transmitting the SRS in each second time-domain resource unit.

2. The method of claim 1, wherein the frequency-domain resource hopping pattern is $f(k)=\mod[g(m)+k \times d(i), N]$, $f(k)$ being a frequency-domain start position of a target resource in a second time-domain resource unit with an index k in the first time-domain resource unit, k being a positive integer, $d(i)$ being a hopping parameter obtained based on a hopping ID i, $g(m)$ being a value of a frequency-domain resource position obtained based on an index m of the first time-domain resource unit, and N being an allowable maximum value of a hopping start position.

3. The method of claim 1, wherein the frequency-domain resources determined by different terminal devices for transmitting SRS in the M second time-domain resource units are different.

4. The method of claim 1, wherein the hopping pattern of the terminal device indicates an association relationship among a position of the frequency-domain resource for transmitting the SRS in each second time-domain resource unit, an index of each second time-domain resource unit and an index of the first time-domain resource unit.

5. The method of claim 1, wherein the multiple second time-domain resource units are the last M symbols of the first time-domain resource unit.

6. The method of claim 1, wherein the frequency-domain resource hopping pattern is exclusive to the terminal device.

7. A method for transmitting a sounding reference signal (SRS), comprising:
    transmitting, by a network device, a Radio Resource Control, RRC, signaling to a terminal device; wherein the RRC signaling is used to configure the terminal device to send a sounding reference signal (SRS) on a number M of multiple second time-domain resource units within a first time-domain resource unit, wherein the first time-domain resource unit is a slot, the multiple second time-domain resource units are multiple symbols and M is an integer;
    determining, by the network device according to a frequency-domain resource hopping pattern, an index of each of the M second time-domain resource units and a position of a frequency-domain resource for receiving the SRS in a first second time-domain resource unit of the M second time-domain resource units, a target frequency-domain resource for receiving the SRS in each second time-domain resource unit; and
    receiving, by the network device according to the target frequency-domain resources, the SRS transmitted by the terminal device.

8. The method of claim 7, wherein the frequency-domain resource hopping pattern is $f(k)=\mod[g(m)+k \times d(i), N]$, $f(k)$ being a frequency-domain start position of a target resource in a second time-domain resource unit with an index k in the first time-domain resource unit, k being a positive integer, $d(i)$ being a hopping parameter obtained based on a hopping ID i, $g(m)$ being a value of a frequency-domain resource position obtained based on an index m of the first time-domain resource unit, and N being an allowable maximum value of a hopping start position.

9. The method of claim 7, wherein the multiple second time-domain resource units are the last M symbols of the first time-domain resource unit.

10. The method of claim 7, wherein the frequency-domain resource hopping pattern is exclusive to the terminal device.

11. A terminal device, comprising:
    a transceiver, configured to receive Radio Resource Control (RRC) signaling from a network device; and
    a processor, configured to determine, according to the RRC signaling, a number M of multiple second time-domain resource units within a first time-domain unit for transmitting a sounding reference signal (SRS), wherein the first time-domain resource unit is a slot, the multiple second time-domain resource units are multiple symbols and M is an integer;
    wherein the processor is further configured to determine, according to a hopping pattern, target frequency-domain resources for transmitting the SRS on each of the last M second time-domain resource units determined by the RRC signaling; and
    wherein the transceiver is further configured to transmit the SRS on the M second time-domain resource units to the network device according to the target frequency-domain resources determined by the processor;
    wherein the hopping pattern is a frequency-domain resource hopping pattern, and the processor is specifically configured to:

determine, according to the frequency-domain resource hopping pattern, an index of each of the M second time-domain resource units and an index of the first time-domain resource unit, a frequency-domain resource for transmitting the SRS in each second time-domain resource unit.

12. The terminal device of claim 11, wherein the frequency-domain resource hopping pattern is f(k)=mod[g(m)+k×d(i), N], f(k) being a frequency-domain start position of a target resource in a second time-domain resource unit with an index k in the first time-domain resource unit, k being a positive integer, d(i) being a hopping parameter obtained based on a hopping ID i, g(m) being a value of a frequency-domain resource position obtained based on an index m of the first time-domain resource unit, and N being an allowable maximum value of a hopping start position.

13. The method of claim 11, wherein the frequency-domain resources determined by different terminal devices for transmitting SRS in the M second time-domain resource units are different.

14. The method of claim 11, wherein the hopping pattern of the terminal device indicates an association relationship among a position of the frequency-domain resource for transmitting the SRS in each second time-domain resource unit, an index of each second time-domain resource unit and an index of the first time-domain resource unit.

15. The terminal device of claim 11, wherein the multiple second time-domain resource units are the last M symbols of the first time-domain resource unit.

16. The terminal device of claim 11, wherein the frequency-domain resource hopping pattern is exclusive to the terminal device.

17. A network device, comprising:
a transceiver, configured to transmit Radio Resource Control (RRC) signaling to the terminal device, wherein the RRC signaling is used to configure the terminal device to send a sounding reference signal (SRS) on a number M of multiple second time-domain resource units within a first time-domain resource unit, wherein the first time-domain resource unit is a slot, the multiple second time-domain resource units are multiple symbols and M is an integer;
a processor, configured to determine, according to a frequency-domain resource hopping pattern, an index of each of the M second time-domain resource units and an index of the first time-domain resource unit, a target frequency-domain resource for receiving the SRS in each second time-domain resource unit; and
wherein the transceiver is further configured to receive, according to the target frequency-domain resources determined by the processor, the SRS transmitted by the terminal device.

18. The network device of claim 17, wherein the frequency-domain resource hopping pattern is f(k)=mod[g(m)+k×d(i), N], f(k) being a frequency-domain start position of a target resource in a second time-domain resource unit with an index k in the first time-domain resource unit, k being a positive integer, d(i) being a hopping parameter obtained based on a hopping ID i, g(m) being a value of a frequency-domain resource position obtained based on an index m of the first time-domain resource unit, and N being an allowable maximum value of a hopping start position.

19. The network device of claim 17, wherein the multiple second time-domain resource units are the last M symbols of the first time-domain resource unit.

20. The network device of claim 17, wherein the frequency-domain resource hopping pattern is exclusive to the terminal device.

* * * * *